United States Patent
Berg

(10) Patent No.: US 6,871,452 B2
(45) Date of Patent: Mar. 29, 2005

(54) MODULAR SHELF UNIT ENCLOSURE OR GREENHOUSE

(75) Inventor: Joel J. Berg, Chicago, IL (US)

(73) Assignee: Berg Manufacturing & Sales Corp., Wheeling, IL (US)

( * ) Notice: Subject to any disclaimer, the term of this patent is extended or adjusted under 35 U.S.C. 154(b) by 0 days.

(21) Appl. No.: 10/419,660

(22) Filed: Apr. 21, 2003

(65) Prior Publication Data

US 2004/0206013 A1 Oct. 21, 2004

(51) Int. Cl.[7] ................................................ E04B 1/12
(52) U.S. Cl. .............................. 52/63; 52/222; 52/273; 135/96; 312/3; 312/4
(58) Field of Search .......................... 52/63, 222, 273; 47/17; 312/3, 4, 5, 6; 135/96, 115, 157, 158, 160

(56) References Cited

U.S. PATENT DOCUMENTS

| | | | | |
|---|---|---|---|---|
| 4,057,941 A | * | 11/1977 | Schwartz | 52/63 |
| 4,076,431 A | * | 2/1978 | Burvall | 403/171 |
| 5,479,744 A | * | 1/1996 | Meyer | 52/63 |
| 5,660,002 A | * | 8/1997 | Lashinger | 52/63 |
| 6,302,284 B1 | * | 10/2001 | Zonshin | 211/187 |

* cited by examiner

*Primary Examiner*—Brian E. Glessner
*Assistant Examiner*—Basil Katcheves
(74) *Attorney, Agent, or Firm*—Charles F. Lind

(57) ABSTRACT

A modular greenhouse enclosure is formed by mounting on a conventional shelf storage unit having spaced shelves supported on upright posts a rigid frame on which an impervious transparent cover is supported. The cover overlies and extends past the side edges of the shelves to define the enclosure. A vertical gap opening in the cover gives access to the shelves within the enclosure, and this opening can selectively be closed. The frame can be modular, formed from a plurality of posts and connectors, generally with three posts secured to each connector held angled relative to one another. Some of these frame posts can be connected to the shelf unit to hold the frame overlying the shelf unit. Several storage units can be positioned proximate one another for increasing shelf capacity, with a single frame and cover overlying all units.

4 Claims, 2 Drawing Sheets

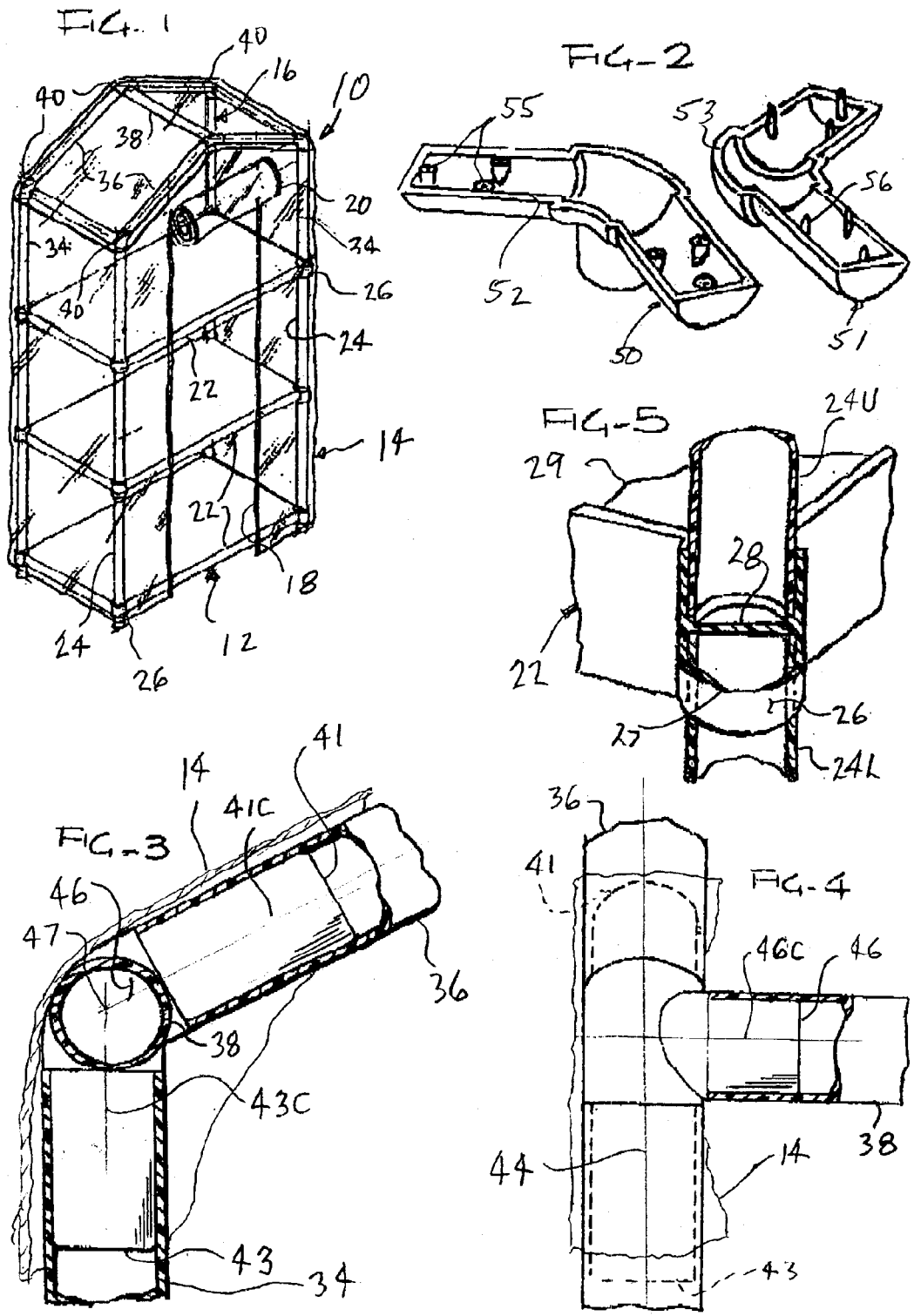

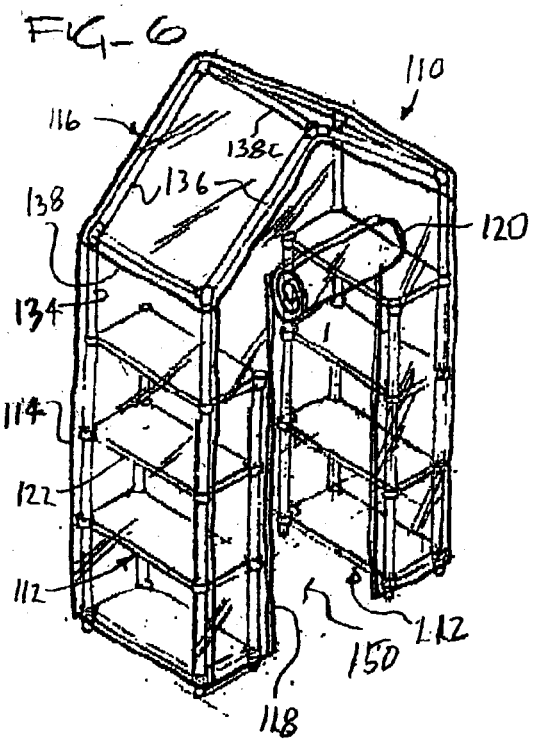
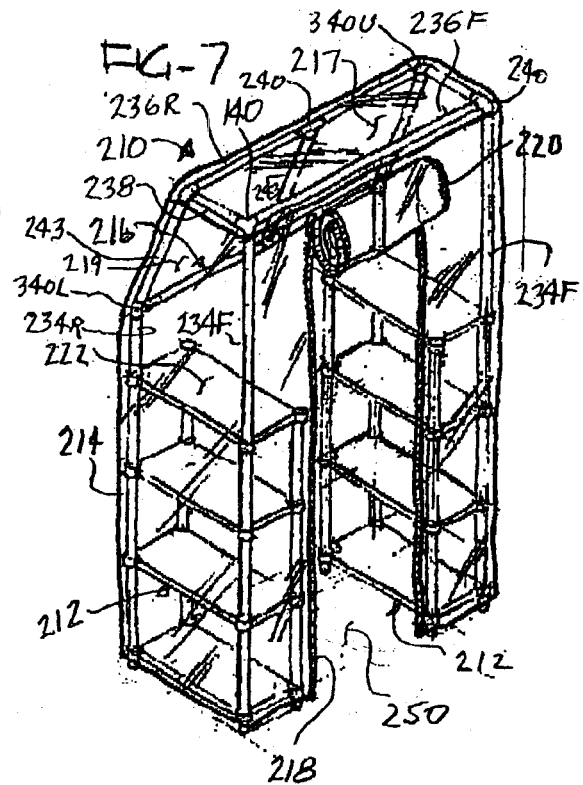
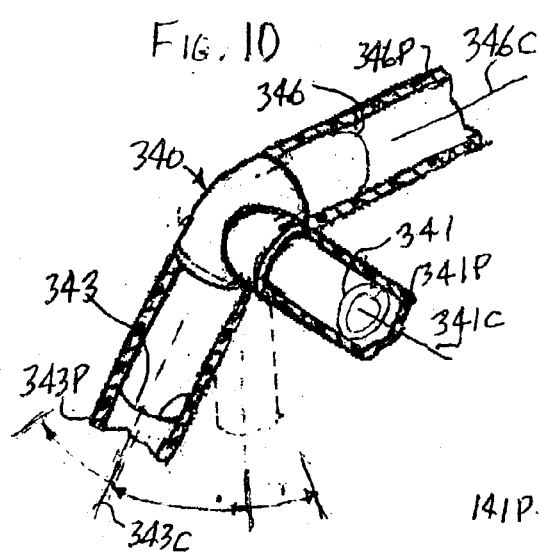
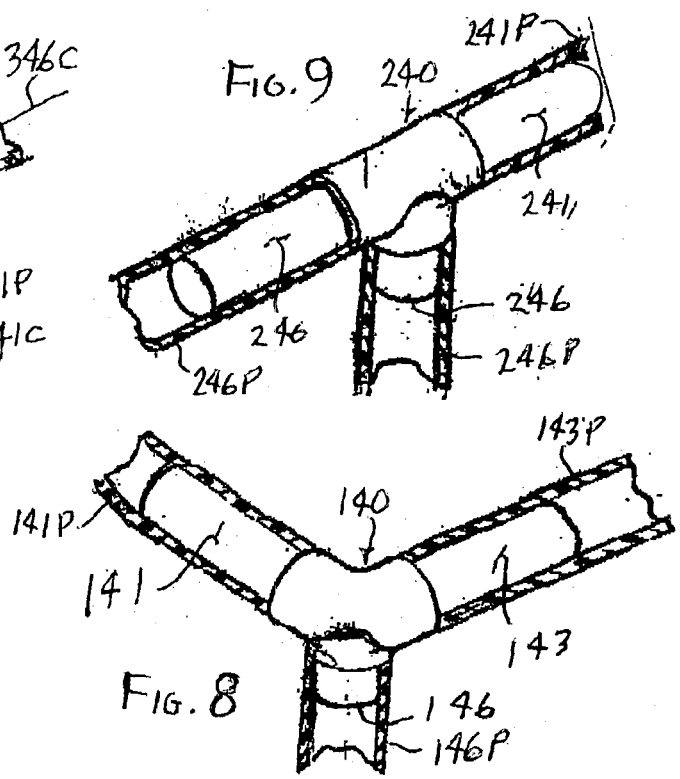
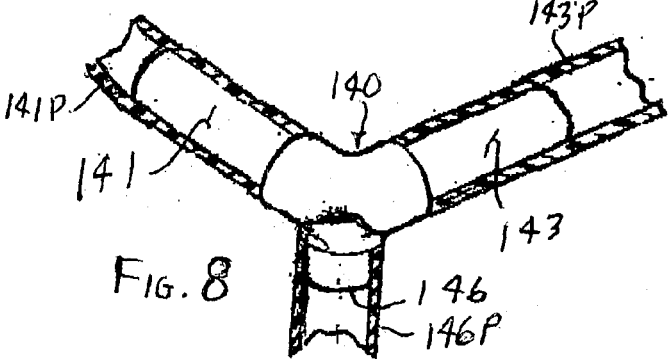

MODULAR SHELF UNIT ENCLOSURE OR GREENHOUSE

BACKGROUND OF THE INVENTION

Modular storage units, now popular, commonly are formed from several typically identical generally planar shelves and a plurality of elongated posts connected between the shelves at their corners and/or midpoints, suited to hold them spaced apart and in parallel association to one another. The post lengths determine the spacing between the shelves, meaning that different shelf configurations or spacings can be created merely by using posts of different lengths.

These storage unit products have several marketing advantages including that the modular shelf and post components can be economically molded of plastic, that different shelf units can be made up by grouping different sizes and/or numbers of the shelf and/or post components, and that the components can be compactly packaged and shipped unassembled to a sales outlet or end user, who can then easily assembly them to the bulky three dimension shelf unit.

Each planar shelf component might have a flat and solid upper surface, or alternatively might be grated with narrow or curved cross ribs that define spaced openings or top surface contours suited to define different specialty products, such as for holding general and/or long handle tool racks, sporting goods, potted plants, etc.

SUMMARY OF THE INVENTION

A basic object of this invention is to provide modular enclosure structures of new and different configurations that achieve added and useful functions, merely by adding a few special items to existing conventional modular structures.

A more detailed object of this invention is to modify one or more modular storage shelf units by adding a frame, formed of different posts and connectors, to overlie and/or interconnect the unit(s), and then by adding a cover, such as a generally transparent plastic sheet over the frame and unit(s), suited to define a greenhouse enclosure for potted plants and the like.

GENERAL DESCRIPTION OF THE DRAWINGS

FIG. 1 is a perspective view of a modular three-shelf unit, converted to a small greenhouse having an access opening and closure panel shown rolled up to the opened condition, being formed with a disclosed modular auxiliary frame and a plastic sheet mounted thereon;

FIG. 2 is a perspective view of two halves of a split two piece connector, that when assembled together can be used to form part of the modular auxiliary frame of FIG. 1;

FIG. 3 is a sectional view, taken generally from line 3—3 in FIG. 1, and showing the one auxiliary frame connector and part of the associated posts and cover in elevation;

FIG. 4 is a left side elevational view of the components of FIG. 3, as seen from each partly broken away and in center section, showing an associated post in broken away section;

FIG. 5 is a perspective view of a conventional shelf component showing its mounting socket broken away and in section and with opposed modular posts fitted therein;

FIGS. 6 and 7 are perspective views illustrating different enclosures or greehouses, utilizing similar four-shelf units but alternate modular frames and enclosing covers; and FIGS. 8, 9 and 10 are perspective views, each partly broken away and in section of different configurations of connectors that could be used in forming the enclosure of FIG. 7, or in forming other enclosures.

DETAILED DISCRIPTION OF THE INVENTION

FIG. 1 illustrates one embodiment of the invention, where a compact enclosure or greenhouse 10 is formed from a generally conventional shelf storage unit 12, modified by the addition of a cover 14 of a impervious transparent plastic sheet supported on an auxiliary frame 16. The cover has separated vertically extended edges defining a gap or access opening 18 therebetween for reaching into the covered unit and tending to the items such as plant pots, seed beds or trays, or the like (not shown) held therein. A panel 20 can cooperate with the cover edges in one position to close the access opening 18 or in another position to be rolled up or otherwise opened to allow a user to reach into the greenhouse interior for any needed care, etc., of the items therein. The closure panel 20 preferably can be formed of a transparent plastic sheet matching the cover 16.

The closed greenhouse 10 can thus have a substantially controlled interior environment, different from its proximate atmosphere. Conventional heaters, hood ventilators, UV lights or even a drip irrigator system can be added to the greenhouse interior as desired. One advantage of this greenhouse is that it can be configured economically, using virtually a conventional modular plastic shelf storage unit 12.

To illustrate this, the conventional shelf unit 12 would consist of a plurality of shelves 22 extended longitudinally parallel to but vertically separated from one another and held in place by posts 24 disposed normal to and extended between the shelves. For shelves 22 having rectangular outer shapes, a post-receiving socket 26, normally formed near each of the four shelf corners (see FIG. 5), might have generally tubular walls 27 separated by a medial transverse stop 28. The upper socket section opens upwardly from the stop 28 and receives post 24U, while the lower socket section opens downwardly from the stop 28 and receives post 24L. The walls of each socket section might extend along an axis generally normal to the shelf top wall 29, and be substantially cylindrical except for a slight molding draft making the socket opening smallest proximate the medial stop 28, and generally smaller than the post exterior. Each post 24 might be uniformly tubular and cylindrical along its length. Properly sized, the post should fit without too much effort initially into the open end of the sockets but then become wedged against the drafted socket walls when it is fully inserted into the socket, sufficient to provide a firm connection between the assembled post and shelf components. However, although typically not needed or used, an adhesive or a locking pin could be used to make each connection more permanent.

The frame 16 in FIG. 1 is modular, being formed of four upstanding front and rear end posts 34, four front and rear medial top posts 36, three end and medial stabilizing cross posts 38, and six connectors 40 respectively cooperating with the adjacent ends of its juncturing posts and rigidly holding the components together as the rigid frame. The upstanding end posts 34 fit into the upper sockets of the top shelf unit 22 and extend perpendicular thereto for holding the frame 16 relative to the shelf unit 12.

Each connector 40, illustrated in greater detail in FIGS. 2, 3 and 4, is shown to have three end projections 41, 43, 46, and each could be sized to fit into the open ends of the tubular posts; and a slight molding draft might be incorporated on the projections to provide that when fully fitted together the post and connector would be mechanically secured together. The projections 41 and 43 lie along one plane 44, but the center axes 41C, 43C thereof are angled 120 degrees apart along the plane 44; while the projection 46 lies along a center axis 46C that is aligned perpendicular to the plane 44. As shown, the center axes 41C, 43C and 46C all meet a point 47.

With the included angle of 120 degrees between the projections 41, 43 as noted, all six of the frame connectors 40 can be identical to one another. Moreover, the four top posts 36 can be of similar lengths, and the three cross posts 38 can be of similar lengths; these two lengths being specific for having the frame posts 34 accurately overlie the top shelf sockets. The end posts 34 will also have equal lengths, operable merely to provide a desired vertical clearance space between the top shelf 22 and the overlying frame and its cover.

FIG. 2 shows that the connector 40 can be molded in a dual cavity mold as two piece halves 50, 51, that could be fitted together with the edges 52, 53 engaging one another to define the connector. As illustrated, each piece can thus have one-half of the connector end projections 41, 43; while piece 50 has the complete end projection 38, and piece 51 will merely have a smooth continuation wall between its end projections 41, 43. Any conventional connecting means might be used, such as by interfering tabs/openings on the respective half pieces or by screws fitted through openings in one half piece and threaded into bosses in the other half piece.

The invention provides that many different configurations of greenhouse or like enclosure can be made up utilizing one or more shelf storage unit(s) and an appropriate overlying interconnecting frame and supported cover. For example, shelf storage units are available in different shelf sizes, shelf numbers and unit heights; and such units can be grouped in different configurations to achieved a wide variety of enclosures. Further, the different frames can use only the connectors already noted or by using modified connectors, and with connecting posts of the needed lengths. The covers would be provided to cooperate with the frames and storage units used.

For example, FIGS. 6 and 7 illustrate enclosures 110, 210 that have similar configurations of two shelf units 112, 212, but that utilize different modular frames 116, 216 and enclosing covers 114, 214. Each of these enclosures 110, 210 has increased shelf space due to the added number of shelves 122, 222, but further has an aisle 150, 250 between the shelf units for improving user walk in access into the enclosure to reach items on the shelves. Each cover 114, 214 can also have an access opening 118, 218, preferably aligned with the respective aisle 150, 250, and a rollup panel 120, 220 for closing the respective access opening when not needed. The shelf units 112, 212 can be the same, but need not be; and each has four shelves, but could have more or less as desired. The frames 116, 216 differ in advantages and drawbacks as will now be noted.

The frame 116 is similar to the disclosed frame 16, and thus as noted already above, advantageously requires only a small inventory of different parts. However, the frame 116 might restrict the possible locations of use of defined enclosures having wide and/or tall multiple shelf units, as the center cross post 138C might become too close to or even exceed the room ceiling height. The maximum height of the access opening 118 further might be less than desired for providing easy access for an intended user.

Specifically, each medial post 136 must be longer than the sum of one shelf depth and one half the aisle width, being related mathematically to this sum divided by the cosine of the connector angle less 90 degrees. Thus, a frame using six 120 degree connectors 140 and having two twelve inch wide shelf units separated by a 24 inch wide aisle, might have two medial posts 136 each approximately 28 inches long. This will create a center cross post 138C rise above the side cross posts 138 (the rise being mathematically related to the medial post 136 length multiplied by the sine of the connector angle less 90 degrees) of perhaps 14 inches. With two five-foot high shelf units and eight inch upstanding posts 134 rising above the units, the center cross post 138C would almost be at the eight foot ceiling height of many homes, making this size enclosure inappropriate for such a room. Moreover, the practical maximum clearance height of the access opening 118 might be only about five feet, requiring many users to duck in order to fit under the cover at the opening.

FIG. 7 illustrates an alternative enclosure 210 having two four-shelf units 212 separated by a walk in aisle 250, and a modular frame 216 and enclosing cover 214 overlying and interconnecting these units. The frame 216 and cover 214 has a flat top section 217, which can yield an adequate stand up interior enclosure height and entry access opening 218 with its closure panel 220, without exceeding a nominal room ceiling height. The frame 216 nonetheless is comprised of a slightly different inventory of posts and connectors than used in the frames 16 and 116.

FIGS. 8, 9 and 10 illustrate three different connectors 140, 240 and 340 that can be used in forming the frame 216, as well as in forming other frames not disclosed herein, but otherwise are suited to interconnect three posts converging to an enclosure frame juncture or corner. The connectors 140, 240, 340 are all related to connector 40 in that they can be made in two halves and assembled in a manner similar to the connector 40 of FIG. 2.

Specifically, FIG. 8 illustrates a right angle connector 140 having three end projections 141, 143, 146 that are oriented normal to each other, where posts 141P, 143P and 146P can be respectively secured thereon to define a right angle frame corner. FIG. 9 illustrates a tee connector 240 having three end projections 241, 243, 246, where projections 241, 246 are axially parallel to one another and are normal to the projection 243; to provide for securing a juncture of three posts 241P, 243P and 246P lying in a single plane. FIG. 10 illustrates connector 340, having three end projections 341, 343, 346 that meet at an angled corner, the center lines 341C and 343C of the projections 341 and 343 defining a plane and the center line 346C of the projection 346 being perpendicular to this plane. The center axes 341C, 343C can be angled relative to one another, from being perpendicular to one another (like connector 140) or axially parallel of one another (like connector 240), or angled at substantially any acute or obtuse angle therebetween as illustrated by angled center lines. The center axes 341C, 343C and 346C would typically all meet a point.

Regarding more specifics of frame 216 (FIG. 7), it has two upstanding front posts 234F secured at their lower ends in sockets of the uppermost shelves 222, and right angle connectors 140 are secured on their upper ends. A single front cross post 236F and two side posts 238 are also secured in these connectors, the posts 234F, 236 and 238 being normal to each other. Two upstanding rear posts 234R are secured at their lower ends in other sockets of the upper shelves, and angled connectors 340L are secured on their upper ends. Two inclined rear posts 243 are secured at their lower ends in the angled connectors 340L and are secured at their upper ends in angled connectors 340U. The rear ends of the side posts 238 are also secured on the connectors 340U. Upper and lower rear cross posts 236R are connected at side ends to the angled connectors 340L, 340U and at their medial ends to tee connectors 240, where a third inclined rear post 243 is secured between these connectors for reinforcing the frame.

The flat top frame allows the use of even massive enclosures within an eight foot ceiling room and further providing a high entry access opening 218 and a rollup closure panel 220.

Use of these and/or other connectors and posts will allow many and easy modifications of the shapes, sizes, strength or rigidity of an assembled frame, without needing an unreasonable inventory of different parts, effective to convert otherwise conventional shelf units into many different greenhouse or enclosure combinations. The supporting frame can be assembled onto one or more of the modular shelf unit(s) without the need of tools and/or high level mechanical skills, as are the shelf unit(s), so that all components can be shipped loose and assembled by the user where needed.

It can be noted further that the vertical frame corner posts can be connected to one or to several shelf unit(s), and the remaining posts and connectors define a medial span that transverses and overlies the shelf storage unit(s) and any aisle defined between adjacent units. The medial portion of the cover overlies and is supported on the medial frame span, while the perimeter portion of the cover is sized larger than the shelf components side edges and depends downwardly from the medial portion to extend past the side edges of the shelf components to define the enclosure. The cover perimeter portion might lie closely adjacent and even touch some or all of the shelf components side edges, depending on the storage unit(s) configuration, while when multiple shelf units are configured, part of the cover perimeter typically will be spaced from the shelf edges. However, in configurations with an aisle between the shelf units, the access opening will preferably be formed in this cover section so as to be aligned with the aisle.

While several variations have been disclosed, others might even be more popular. One variation could arrange three shelf units in a "U", with two like units being separated on opposite sides of an aisle while the third unit might be extended lengthwise between the units to close the aisle end opposite the access opening. In one possible "U" configuration, the third unit might lie against corresponding ends of the two units, so that its shelves might have a length equal to twice the width of the two shelf units and the width of the aisle. The frame could have a flat top section 217 that overlies the side units and an inclined rear section 219 that overlies the rear crossing shelf unit. Alternatively, the frame could use four right angle connectors at the frame corners to provide a flat top section that overlies at the maximum height all three shelve units. Accordingly, the invention is to be defined not by the disclosure but by the scope of the claims.

What is claimed as my invention is:

1. A modular greenhouse or enclosure, comprising the combination of a free standing storage unit having several shelf components and a plurality of posts, each shelf components having angularly arranged peripheral side edges and means proximate the side edges to provide connections to said posts operable to hold said shelf components in separated generally parallel overlying association with each other and with the side edges in vertical alignment;

a separate rigid modular frame having spaced end projections and a medial span extended between the end projections, and means to separably connect the end projections relative to the storage unit operable to hold said medial span in vertically separated overlying association with the uppermost shelf component;

a cover in the form of a generally impervious and transparent plastic sheet having a medial portion adapted to overlie and be supported on the medial frame span and having a perimeter portion sized larger than the shelf components side edges and depending downwardly from the medial portion adapted to extend past the side edges of the shelf components and posts and enclose the storage unit, and said cover perimeter portion including a first section thereof lying closely adjacent certain shelf components side edges and having a second section thereof enclosing the remaining shelf components side edges; and the cover perimeter portion second section having a vertically elongated gap opening therein operable to provide access to said shelves within the enclosure, and a panel suited to cooperate with the cover perimeter portion to close the gap opening and enclosure and suited in a rolled up position to expose the gap opening and provide said shelf access.

2. A modular greenhouse or enclosure according to claim 1, further comprising the use therein of a second free standing storage unit similar to the first free standing storage unit, the different free standing storage units being located proximate but spaced from one another to define an aisle therebetween, said separate rigid frame overlying and having end connections to each storage unit, and said cover second section having said gap opening aligned with the aisle to provide said shelf access via the aisle between said storage units.

3. A modular greenhouse or enclosure according to claim 1, further comprising the frame including of a plurality of posts having ends suited to form said frame end connections, a plurality of connectors each having three end projections to connect with three posts and hold them angled relative to one another in the rigid frame, each connector being comprised as two separable half pieces each having engaging edges and means connecting the respective half piece edges together to form the whole connector, one half piece of each connector being shaped to provide one half of two of the connector end projections and the other half piece of each connector being shaped to provide the other half of the two connector end projections and a complete third end projection.

4. A modular greenhouse or enclosure according to claim 3, further comprising the use therein of a second free standing storage unit similar to the first free standing storage unit, the different free standing storage units being located proximate but spaced from one another to define an aisle therebetween, said separate rigid frame overlying and having end connections to each storage unit, and said cover second section having said gap opening aligned with the aisle to provide said shelf access via the aisle between said storage units.

* * * * *